(12) United States Patent
Lotz

(10) Patent No.: US 10,213,860 B2
(45) Date of Patent: Feb. 26, 2019

(54) SCARFING HEAD

(71) Applicant: Gefam GmbH, Koenigstein im Taunus (DE)

(72) Inventor: Horst Karl Lotz, Koenigstein im Taunus (DE)

(73) Assignee: Gefam GmbH (DE)

( * ) Notice: Subject to any disclaimer, the term of this patent is extended or adjusted under 35 U.S.C. 154(b) by 245 days.

(21) Appl. No.: 15/089,515

(22) Filed: Apr. 2, 2016

(65) Prior Publication Data

US 2016/0288233 A1 Oct. 6, 2016

(30) Foreign Application Priority Data

Apr. 2, 2015 (DE) .......................... 10 2015 105 144

(51) Int. Cl.
*B23K 7/06* (2006.01)
*F23D 14/56* (2006.01)

(52) U.S. Cl.
CPC ................ *B23K 7/06* (2013.01); *F23D 14/56* (2013.01)

(58) Field of Classification Search
CPC ....................................................... B23K 7/06
USPC ........................................................ 266/51
See application file for complete search history.

(56) References Cited

U.S. PATENT DOCUMENTS

| 2,483,479 A * | 10/1949 | Smith | ...................... | B23K 7/06 |
| | | | | 239/423 |
| 5,497,976 A | 3/1996 | Showalter et al. | | |
| 2006/0108724 A1 * | 5/2006 | Sato | ...................... | C21B 13/10 |
| | | | | 266/217 |
| 2013/0032250 A1 | 2/2013 | Sato et al. | | |
| 2016/0288233 A1 * | 10/2016 | Lotz | ...................... | B23K 7/06 |

FOREIGN PATENT DOCUMENTS

| DE | 628135 A | 3/1936 |
| DE | 1629960 A1 | 2/1971 |
| EP | 0495144 A1 | 7/1992 |

(Continued)

OTHER PUBLICATIONS

Office Action dated Jan. 18, 2016, German Patent Appln No. 10 2015 105144.3, six (6) pages.

(Continued)

*Primary Examiner* — Scott R Kastler
(74) *Attorney, Agent, or Firm* — Fish IP Law, LLP

(57) ABSTRACT

A scarfing head (100) is proposed for scarfing a surface of a workpiece produced by casting, in particular a slab, with a gas outlet side (400) for gases for scarfing, wherein a flame for scarfing can be formed at the gas outlet side; with a plurality of cutting nozzles (120) which are individually fixed on the gas outlet side; and with a central gas conduit (110) in the scarfing head; wherein the plurality of cutting nozzles (120) are disposed around the central gas conduit (110); wherein the scarfing head (100) is so designed that heating gas (150) and heating oxygen (150) can exit through this plurality of cutting nozzles; and wherein the scarfing head (100) is further so arranged that scarfing oxygen can emerge through the central gas conduit (110). Thus a particularly high heating performance is achieved over a comparatively large area. The maintenance and cleaning of the scarfing head is significantly facilitated through the use of many individually fixed cutting nozzles.

7 Claims, 4 Drawing Sheets

(56) References Cited

FOREIGN PATENT DOCUMENTS

| EP | 0722803 A1 | 7/1996 |
|----|------------|--------|
| WO | 2011-154043 A1 | 12/2011 |
| WO | 2013-018754 A1 | 2/2013 |

OTHER PUBLICATIONS

EP Search Report, EP Appln. No. 16162841.7, dated Aug. 5, 2016, 6 pages.

* cited by examiner

SCARFING HEAD

FIELD OF THE INVENTION

The invention relates to a scarfing head for scarfing a surface of a workpiece produced by casting, in particular a slab, as well as a corresponding method.

Scarfing heads are used in scarfing devices in the form of either an automatic machine or a hand-held scarfing device. Scarfing work is needed in particular for smoothing and cleaning the surfaces of slabs. Upon cooling of slabs produced by casting, unwanted cracks often form on the surface and have to be removed by a surface treatment, namely scarfing. This also applies to burrs or beards which arise when processing the slab, for example, by flame cutting. When scarfing, the surface of the slab is heated and when the ignition temperature of the steel is reached, a stream of oxygen (so-called scarfing oxygen) is blown over it. The material at the surface of the slab burns off leaving the desired smooth surface. The scarfing burner is guided along the affected areas to eliminate the surface defects.

PRIOR ART

Gas burners for scarfing work, which comprise a plurality of coaxially arranged tubes for oxygen supply that are surrounded by several tubes arranged around them for a combustible gas supply, are known.

Thus DE 20 2006 008 760 U1 discloses a gas burner nozzle for scarfing work with a central oxygen conduit consisting of several tubes with several tubes for the supply of heating gas arranged around said oxygen supply. In this case, the tubes for the supply of oxygen are arranged in groups, wherein the individual groups are coaxial to each other and spaced apart, and each group consists of at least two annularly arranged rows of tubes. Further, the gas burner nozzle is characterized by three groups of tubes for the supply of oxygen.

A significant disadvantage of this kind of gas burner nozzle is that the oxygen is supplied via tubes which are grouped together. Introducing the plurality of tubes into the gas burner nozzle body is extremely complicated and material and cost-intensive. All of the tubes have to be individually soldered into the nozzle body. Thus, the production of this gas burner nozzle is very expensive. A further disadvantage is that the groups of tubes each consist of at least two or even three annularly arranged rows of tubes.

In WO 99/61192 A1, a similar scarfing burner is disclosed, whose construction, however, is even more complicated and expensive.

The scarfing head disclosed in WO 2011/154043 A1 is, in particular, more cost-effective to manufacture and produces a better shaped flame; wherein oxygen consumption is reduced and the scarfing range is extended.

The scarfing heads mentioned above all have the disadvantage that the start of the scarfing involves considerable effort. Either the workpiece surface has to be heated to the ignition temperature with the scarfing burner before the start of the actual scarfing, which requires a considerable amount of time. Or the start of the scarfing is effected with iron powder, which requires a more complex apparatus requiring additional consumables, as well as increasing fouling by spraying slag as a result. In addition, the maintenance and cleaning of the scarfing head, which has to be performed regularly due to the slag spraying back (especially during the start of the scarfing), is always associated with a high expenditure.

Object

The object of the invention is to provide a scarfing head and a method which avoid the disadvantages known from the prior art, or at least minimize them.

Solution

This object is achieved by the subject matter of the independent claims. Advantageous further developments of the subject matter of the independent claims are characterized in the sub-claims. The wording of all the claims is incorporated by reference into this description.

A scarfing head is proposed for scarfing a surface of a workpiece produced by casting, in particular a slab, with a gas outlet side with a burner plate, wherein a flame for scarfing can form at the gas outlet side, with a plurality of cutting nozzles, which are individually fixed to the burner plate; and with a central gas conduit in the scarfing head; wherein the plurality of cutting nozzles is arranged around the central gas conduit; and wherein the said scarfing head is so configured that heating gas and/or heating oxygen can exit through the plurality of cutting nozzles; and wherein the scarfing head is further so configured that scarfing oxygen can exit through the central gas conduit.

The heating gases used in this case may be, for example, natural gas (methane), but also other suitable hydrocarbons (e.g. propane or butane). The cutting nozzles are typically fixed by a screw connection, but any other fixing connections are also conceivable, e.g. a bayonet connection. The cutting nozzles may be configured for either internal or external mixing of the heating gases and the heating oxygen. In the case of internal mixing, the heating gases and heating oxygen are already mixed together inside the cutting nozzle, while in the case of external mixing, this only takes place after the gases have emerged from separate holes in the nozzle body.

Such a scarfing head achieves particularly high heating power over a comparatively large area. This allows the surface of the workpiece to be quickly brought to ignition temperature, which greatly speeds up the start of the scarfing process. Therefore, one can dispense with the use of iron powder. In addition, by means of the use of many individually fixed cutting nozzles, the maintenance and cleaning of the scarfing head is made considerably easier, since the cutting nozzles may be individually removed and also replaced for this purpose.

Moreover, the use of cutting nozzles for the heating allows double use of possibly already existing cutting nozzles—with corresponding cost advantages.

Even better heating capacity, due to a better focusing of the flame, is achieved if the cutting nozzles have a concave cup-like recess at their gas outlet side, into which heating gas and/or heating oxygen can exit.

In a further development of the scarfing head, the plurality of cutting nozzles are so arranged that their outlet sides are aligned with the burner plate of the scarfing head in the fixed state. For this purpose they are, for example, located in corresponding recesses in the burner plate.

In an alternative development, the plurality of cutting nozzles are so arranged that their outlet sides protrude from the burner plate of the scarfing head in the fixed state. This has the advantage that they can be easily removed individually, even in a fouled state (for example, with slag residues), and maintenance and cleaning carried out.

A round scarfing head which can scarf a particularly large surface is obtained by arranging the plurality of cutting nozzles concentrically around the central gas conduit. This central bore for the scarfing oxygen typically has a diameter of 12-14 mm, preferably 13 mm, on the inlet side, while the outlet side has a diameter of 13-16 mm, preferably 15 mm, and is thus slightly conical, wherein the opening angle is preferably 7°. With such a scarfing head, an area with a diameter of about 200 mm may typically be scarfed when the scarfing head is oriented obliquely to the surface of the workpiece. In this case, an angle of 30° relative to the horizontal is preferred. The large area significantly reduces the number of passes that the scarfing head must travel over the surface of the workpiece during the scarfing, thus leading to a faster and less complex process.

A linear scarfing head, which, for example, is adapted to scarf one side of a slab in a single pass, the central gas conduit is designed as a gap or slit, and the plurality of cutting nozzles are arranged parallel to and on both sides of the central gas conduit. The cutting nozzles thus form the burner lips on both sides of the central gas conduit. The cutting nozzles may be arranged either opposite to each other or offset with respect to the central gas conduit.

When one uses a scarfing machine equipped with such a scarfing head, in association with a continuous casting plant, the use of the residual heat of the slabs results in a further advantage. Upon leaving the casting plant, the slabs have a temperature of about 600-800° C. In conjunction with the large heat output produced by the scarfing head according to the invention, a "flying" start to the scarfing can be achieved: the slabs do not need to be stopped until the ignition temperature is reached before scarfing begins, as it is sufficient if their travel speed is reduced to about 60-80 mm/min. This is sufficient to bring the region heated by the scarfing head up to the ignition temperature in passing, and for the scarfing process to begin. Once this has been done, the travel speed may be increased again to a typical scarfing value of e.g. 12-15 m/min.

The exact location of the start of the scarfing on the surface of the slab may be determined if a group of one to three adjacent cutting nozzles located on the front side of the central gas conduit of the above described scarfing head are displaced by 3-7 mm, preferably 5 mm, away from the central gas conduit. At this point, the slab surface is heated first, so it is here that it first reaches its ignition temperature, whereupon the scarfing process can begin. This spreads out from this position to both sides.

To achieve the object, a method for scarfing a surface of a workpiece produced by casting, in particular a slab, is also proposed, wherein a scarfing head, as described above, is used.

Individual method steps are described in detail below. The steps need not necessarily be performed in the order presented, and the method to be outlined may also have further unspecified steps.

The following steps are preferably carried out in the method: First, an edge of the workpiece is heated with the scarfing head to the ignition temperature of the material of the workpiece; then, after reaching the ignition temperature, scarfing oxygen is passed over the workpiece via the central gas conduit and the scarfing head and workpiece are moved in a direction relative to one another.

In a preferred development of the method, the movement is continued in the opposite direction after reaching an end of the workpiece during the relative movement. During this movement in the opposite direction, heating gas and heating oxygen are no longer directed at the workpiece from the scarfing head, but only scarfing oxygen. In this manner, any possibly remaining residual slag is blown from the surface of the workpiece during the return travel of the scarfing head. In this way, a particularly smooth surface is achieved, and any cracks possibly existing in the workpiece are highly visible, so that they can be post-processed as required.

The cutting nozzles have at least one cutting oxygen bore. In one possible embodiment of the method, during the heating of the workpiece to the ignition temperature of its material, no oxygen is directed at the workpiece through the at least one cutting oxygen bore of the cutting nozzle. The cutting nozzles thus operate as a pure heating device.

In a preferred embodiment of the method, additional heating gas and heating oxygen is supplied through the at least one cutting oxygen bore of at least one of the cutting nozzles towards the workpiece during the heating of the workpiece to the ignition temperature of its material. The pressure, in particular of the oxygen, is reduced, so that only a heating flame is produced and not a flame for flame cutting. The heating capacity is further increased and the start of the scarfing process further accelerated through these measures.

This embodiment of the method is particularly suitable for the displaced group of cutting nozzles in the case where a linear scarfing head, as described above, is used. The start of the scarfing can thus be further accelerated and its position can be determined with greater certainty.

Further details and features will become apparent from the following description of preferred embodiments in conjunction with the dependent claims. The respective features may be implemented on their own or together in combination. The ways to solve the task are not limited to the embodiments. Thus, for example, the range information always comprises all the intermediate values—not mentioned—and all conceivable sub-intervals.

The embodiments are shown schematically in the figures. The same reference numerals in the individual figures denote identical elements or functionally identical elements with respect to their corresponding functions:

Figure 1:
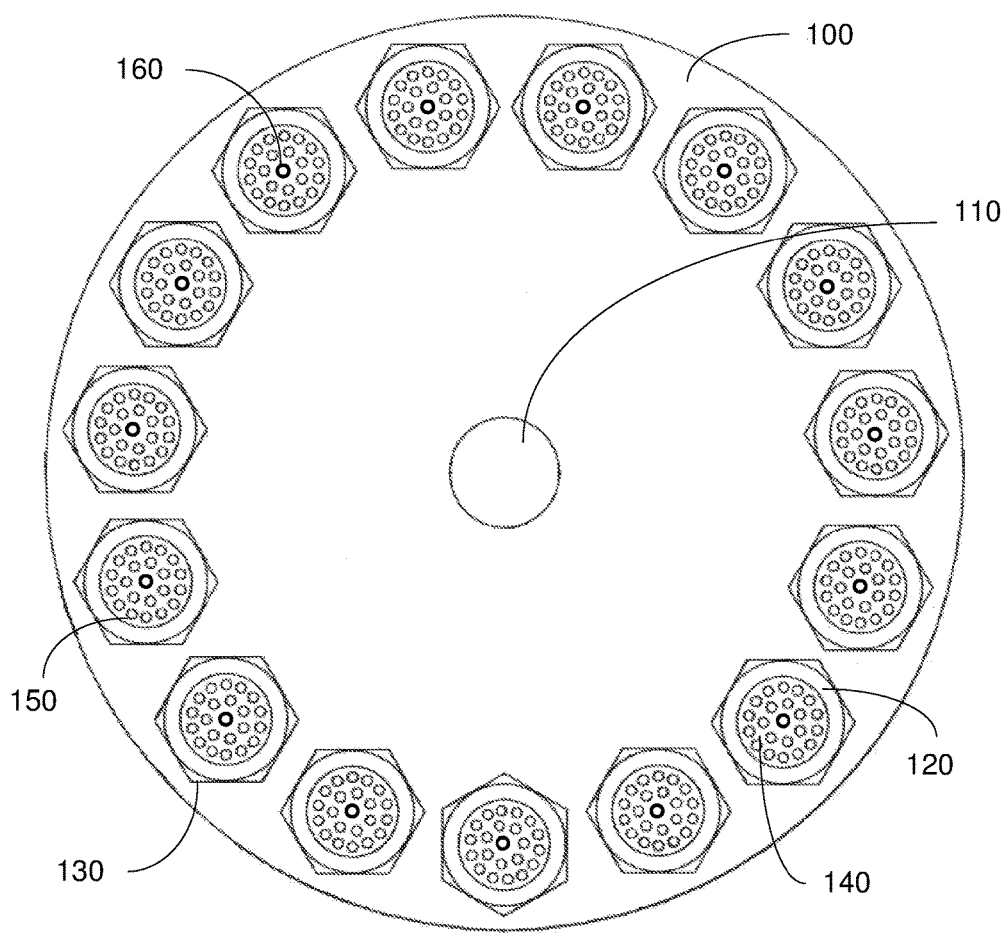
FIG. 1 shows a schematic plan view of the gas outlet side of a round scarfing head according to the invention.

FIG. 1 shows a plan view of the gas outlet side of a round scarfing head 100 according to the invention. In the centre, there is the outlet opening 110 of the central gas conduit for scarfing oxygen. In a typical application, this has a diameter of about 15 mm. The cutting nozzles 120, 15 nozzles in this example, are arranged equidistant around it. These have a hexagonal shape 130 on their outside to facilitate screwing and unscrewing. There is a cup-like concave recess 140 in the gas outlet side of each cutting nozzle, in which the flame is formed and focused. To this end, outlet openings 150 are provided at the bottom of each recess for the heating gas and heating oxygen (not differentiated here). These may be arranged in many different ways, but typically in concentric rings. The outlet opening 160 of the cutting oxygen conduit is located in each case in the centre of the cutting nozzle. These may be used in the context of this invention for an additional supply of heating gas and oxygen.

Figure 2:
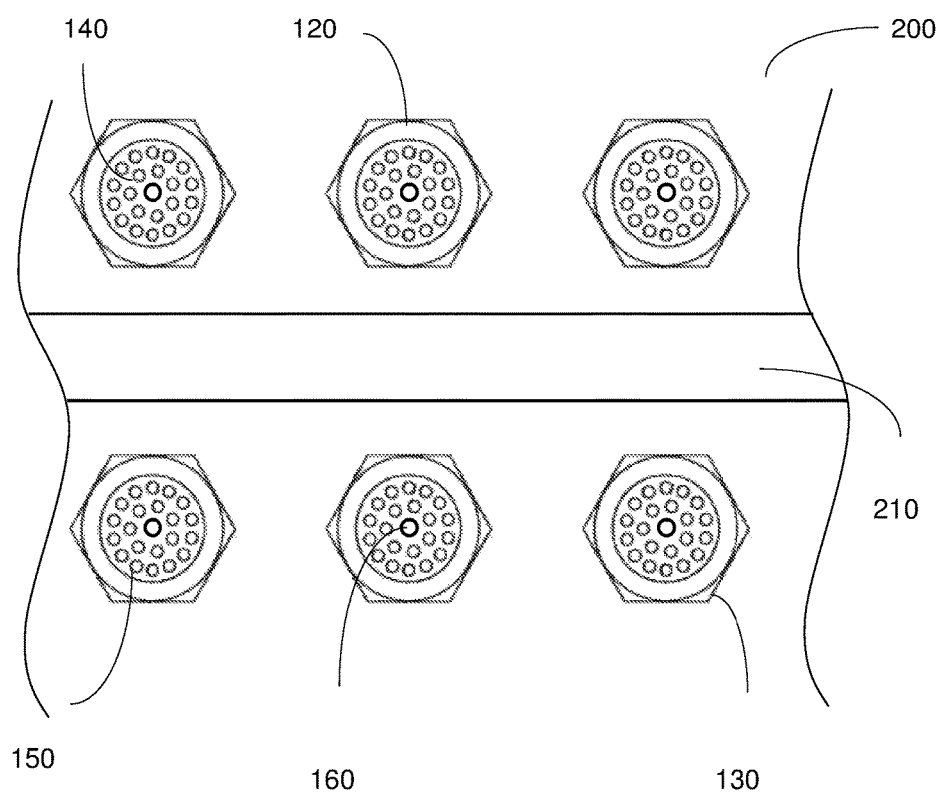
FIG. 2 shows a schematic plan view (section) on the gas outlet side of a linear scarfing head according to the invention.

FIG. 2 shows the gas outlet side of a linear scarfing head 200 in a plan view. The length of such scarfing heads is typically chosen so that the entire width of the slab to be scarfed can be processed in a single pass. The central gas conduit opens into a gap 210, which extends over the entire length of the scarfing head. The cutting nozzles 120 are located on either side of this gap, and are arranged opposite each other in this example. However, a staggered arrangement is equally conceivable. These again have a hexagonal shape 130 and a cup-like concave recess 140 with outlet openings 150 in their respective outlet sides for the heating gas and heating oxygen and a central outlet opening 160 for a cutting oxygen supply. Again, this central outlet opening 160 may be used for an additional supply of heating gas and oxygen.

Figure 3:
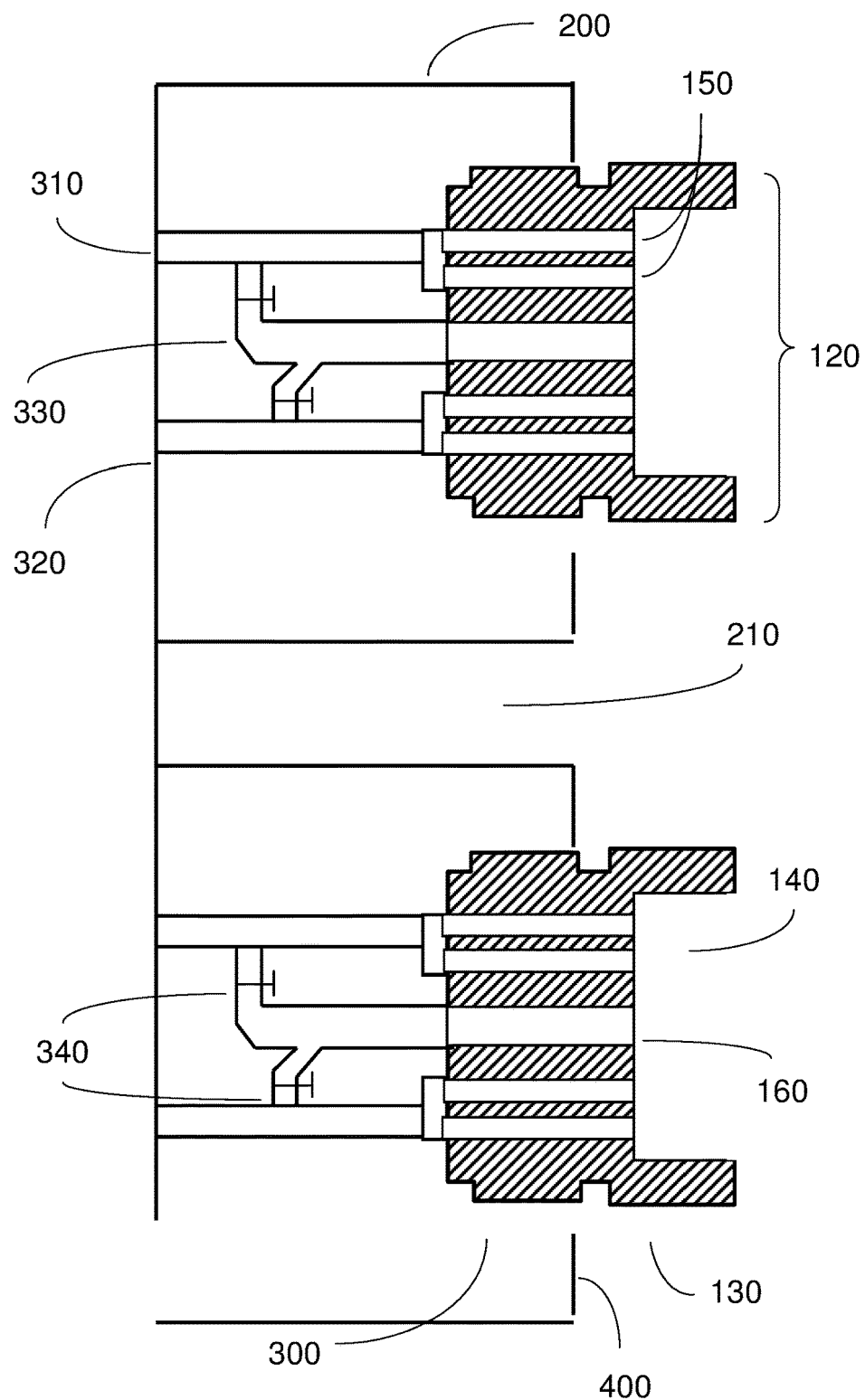
FIG. 3 shows a schematic cross-section through a linear scarfing head according to the invention.

FIG. 3 shows a cross-section through such a linear scarfing head 200. In this case, the cutting nozzles 120 are fixed on the scarfing head 200 by means of a thread 300 such that they extend beyond the burner plate 400. The hexagonal shape 130 is always easily accessible. The conduits 310 and 320 for heating gas and heating oxygen are shown here, and provide the supply lines or bores in the cutting nozzles, which empty into the pot 140 through the outlet openings 150. Further lines 330 are provided to connect the cutting oxygen supplies 160 of the cutting nozzles 120 with the conduits 310 and 320 for the heating gas and heating oxygen via the valves 340 in order to achieve an increased heating capacity when needed.

Figure 4:
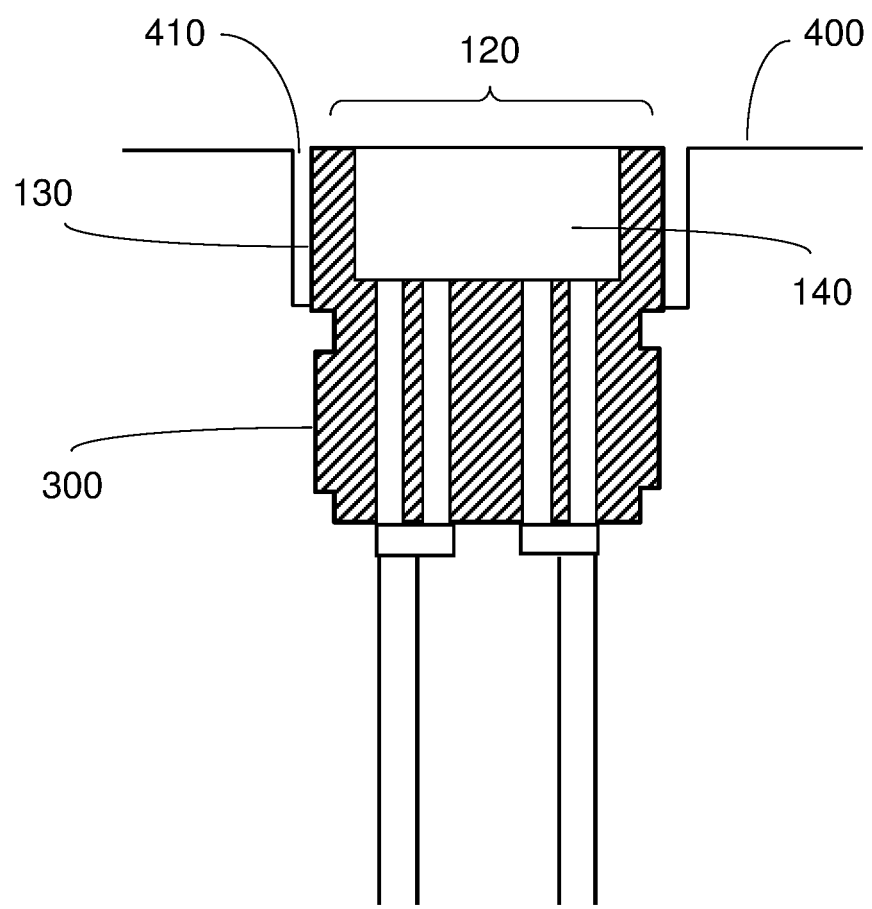
FIG. 4 shows a detail of a schematic section through a scarfing head according to the invention.

FIG. 4 shows how a cutting nozzle 120 is mounted in a scarfing head such that it is flush with the burner plate 400 of the scarfing head. A recess 410 is provided around the hexagonal shape 130, which must be so dimensioned that the respective tool can reach inside in order to screw the cutting nozzle in or out by means of the thread 300. Alternatively, the recess may be minimized if the pot-like concave recess 140 of the cutting nozzle has, for example, a hexagonal shape.

Glossary

Burner Plate

This is a flat surface at the gas outlet side of a gas burner, in particular a scarfing head. The actual gas outlet nozzles are mounted on the burner plate.

Cutting Nozzle

A cutting nozzle is a gas supply nozzle, which is used to form a flame for the oxygen flame cutting of workpieces produced by casting, particularly slabs. A cutting nozzle always has gas conduits for heating gases, frequently for heating oxygen as well. Furthermore, it always has at least one gas conduit, usually centrally located, for cutting oxygen, i.e. oxygen which is needed for the actual flame cutting of the metallic workpiece.

REFERENCE NUMERALS

100 Scarfing head, round
110 Central gas outlet opening
120 Cutting nozzle
130 Hexagonal shape
140 Pot-shaped, concave recess
150 Outlet opening for heating gas and heating oxygen
160 Outlet opening for cutting oxygen
200 Scarfing head, linear
210 Central gas outlet gap
300 Thread
310 Heating gas conduit
320 Heating oxygen conduit
330 Line for additional conduit of the cutting oxygen hole
340 Valve
400 Burner plate
410 Recess

LITERATURE CITED

Cited Patent Literature

DE 20 2006 008 760 U1
WO 99/61192 A1
WO 2011/154043 A1

The invention claimed is:

1. A scarfing head for scarfing a surface of a workpiece produced by casting, comprising:
  a burner plate having a gas outlet side, wherein a flame for scarfing can form at the gas outlet side;
  a plurality of cutting nozzles that are individually removably coupled to the burner plate, wherein each nozzle of the plurality of cutting nozzles comprises multiple outlet openings;
  wherein the burner plate comprises a central gas conduit;
  wherein the plurality of cutting nozzles are arranged around the central gas conduit;
  wherein the scarfing head is so configured that heating gas and/or heating oxygen can exit through the plurality of cutting nozzles; and
  wherein the scarfing head is further so configured that scarfing oxygen can exit through the central gas conduit.

2. Scarfing head according to claim 1, wherein the cutting nozzles comprise a concave recess at their gas outlet side, into which heating gas and/or heating oxygen can exit.

3. Scarfing head according to claim 1, wherein the plurality of cutting nozzles are flush with the gas outlet side of the burner plate when the plurality of cutting nozzles are coupled to the burner plate.

4. Scarfing head according to claim 1, wherein the plurality of cutting nozzles protrude past the gas outlet side of the burner plate when the plurality of cutting nozzles are coupled to the burner plate.

5. Scarfing head according to claim 1, wherein the plurality of cutting nozzles are arranged concentrically around the central gas conduit.

6. Scarfing head according to claim 1, wherein the central gas conduit is formed as a gap and the plurality of cutting nozzles are arranged parallel to and on both sides of the central gas conduit.

7. Scarfing head according to claim 1, wherein a group of one to three nozzles of the plurality of nozzles is displaced by—3-7 mm away from the central gas conduit relative to remaining nozzles of the plurality of nozzles.

* * * * *